United States Patent
Yu (10) Patent No.: US 11,951,685 B2
(45) Date of Patent: Apr. 9, 2024

(54) SERVO MOTOR DRIVE CIRCUIT AND 3D PRINTING APPARATUS

(71) Applicant: ZHUHAI SAILNER 3D TECHNOLOGY CO., LTD., Zhuhai (CN)

(72) Inventor: Pingchu Yu, Zhuhai (CN)

(73) Assignee: ZHUHAI SAILNER 3D TECHNOLOGY CO., LTD., Zhuhai (CN)

( * ) Notice: Subject to any disclaimer, the term of this patent is extended or adjusted under 35 U.S.C. 154(b) by 274 days.

(21) Appl. No.: 17/516,454

(22) Filed: Nov. 1, 2021

(65) Prior Publication Data

US 2022/0048248 A1  Feb. 17, 2022

Related U.S. Application Data

(63) Continuation of application No. PCT/CN2020/083150, filed on Apr. 3, 2020.

(30) Foreign Application Priority Data

May 17, 2019 (CN) .......................... 201910412904.8

(51) Int. Cl.
*H02P 7/29* (2016.01)
*B29C 64/227* (2017.01)
(Continued)

(52) U.S. Cl.
CPC .......... *B29C 64/227* (2017.08); *B29C 64/393* (2017.08); *G05B 19/232* (2013.01); *H02P 7/2913* (2013.01); *B33Y 30/00* (2014.12)

(58) Field of Classification Search
CPC .................................................... H02P 7/2913
(Continued)

(56) References Cited

U.S. PATENT DOCUMENTS 10,919,213 B2 * 2/2021 Jiang ..................... B29C 64/205
11,791,813 B2 * 10/2023 Li ............................. H03K 7/08
388/811

(Continued)

FOREIGN PATENT DOCUMENTS

CN         101610064 A       12/2009
CN         104242873 A       12/2014
(Continued)

OTHER PUBLICATIONS

Notice of Allowance for the parallel application JP2021-564961.
(Continued)

*Primary Examiner* — Kawing Chan
(74) *Attorney, Agent, or Firm* — J.C. PATENTS (57) ABSTRACT

The present application provides a servo motor drive circuit and a 3D printing apparatus, a motion controller is configured to send a drive enable signal to the timer; a pulse period providing unit is configured to send a pulse period value to the timer and the first comparing unit at beginning of each pulse period; the timer is configured to perform initialization in response to the received pulse period value during enabling of the drive enable signal, perform cyclic timing by taking the pulse period value as a timing period, and send a timing duration to the first comparing unit; and the first comparing unit is configured to acquire current level information that satisfies a preset duty ratio according to the preset duty ratio, the pulse period value, and the timing duration, and send a drive signal to a servo motor according to the current level information.

14 Claims, 5 Drawing Sheets

(51) Int. Cl.
*B29C 64/393* (2017.01)
*G05B 19/23* (2006.01)
*B33Y 30/00* (2015.01)

(58) Field of Classification Search
USPC ......................................................... 318/567
See application file for complete search history.

(56) References Cited

U.S. PATENT DOCUMENTS

| | | | |
|---|---|---|---|
| 2008/0159378 | A1 | 7/2008 | Kris |
| 2022/0069814 | A1* | 3/2022 | Li .................... H03K 5/1565 |

FOREIGN PATENT DOCUMENTS

| | | |
|---|---|---|
| CN | 204584272 U | 8/2015 |
| CN | 107482968 A | 12/2017 |
| CN | 108551336 A | 9/2018 |
| CN | 108663994 A | 10/2018 |
| CN | 109995348 A | 7/2019 |
| CN | 110142965 A | 8/2019 |
| EP | 0338751 | 10/1989 |
| JP | H03218845 A | 9/1991 |
| JP | H03228102 A | 10/1991 |
| JP | H05176547 A | 7/1993 |
| JP | H08168297 A | 6/1996 |
| JP | H09187578 A | 7/1997 |
| JP | H1153008 A | 2/1999 |
| JP | 2009153369 A | 7/2009 |
| JP | 2010137482 A | 6/2010 |
| JP | 2014039377 A | 2/2014 |

OTHER PUBLICATIONS

First Office Action of the priority application CN201910412904.8.
International Search Report of PCT/CN2020/083150.

* cited by examiner

SERVO MOTOR DRIVE CIRCUIT AND 3D PRINTING APPARATUS

CROSS-REFERENCE TO RELATED APPLICATIONS

The present application is a continuation of International Application No. PCT/CN2020/083150, filed on Apr. 3, 2020, which claims priority to Chinese Patent Application No. 201910412904.8, filed with the China National Intellectual Property Administration on May 17, 2019 and entitled "SERVO MOTOR DRIVE CIRCUIT AND 3D PRINTING APPARATUS". The disclosures of the aforementioned applications are hereby incorporated by reference in their entireties.

TECHNICAL FIELD

The present application relates to the technical field of drive control, and in particular, to a servo motor drive circuit and a 3D printing apparatus.

BACKGROUND

An existing 3D printer generally includes a carriage and a support platform, and a printing head is mounted on the carriage. Usually, the carriage is driven by a servo motor to maintain a uniform motion in a printing area, and perform an accelerated motion or a decelerated motion in a non-printing area. For example, before printing a target object, the carriage needs to perform an accelerated motion until a moving speed of the carriage reaches a set speed value in the printing area; and after completing a current printing area of the target object, the carriage needs to perform a decelerated motion until the speed is 0; and then, an accelerated motion is performed to print a next area. Therefore, it is necessary to accurately control an accelerated rotation, a uniform rotation and a decelerated rotation of the servo motor according to motion requirements.

In the prior art, the rotation of the servo motor is controlled by software of a single-chip microcomputer or a computer, and then the carriage is driven to alternatively perform the accelerated motion, the uniform motion and the decelerated motion.

However, intervention of interruption is required in an acceleration phase or a deceleration phase for the single-chip microcomputer or the computer to change frequency of an output drive signal, thereby causing a problem of discontinuity in the accelerated motion and the decelerated motion of a moving part.

SUMMARY

Embodiments of the present application provide a servo motor drive circuit and a 3D printing apparatus, which change frequency of an output drive signal autonomously, and improve stability of a duty ratio of a drive signal, thereby improving continuity of an accelerated motion and a decelerated motion of a moving part in the 3D printing apparatus.

According to a first aspect of the embodiments of the present application, a servo motor drive circuit is provided, which includes: a motion controller, a timer, a first comparing unit and a pulse period providing unit;

the motion controller is connected to the timer, and is configured to send a drive enable signal to the timer;

the pulse period providing unit is connected to the timer and the first comparing unit, and is configured to send a pulse period value to the timer and the first comparing unit at beginning of each pulse period;

the timer is connected to the first comparing unit, and is configured to perform initialization in response to the received pulse period value in an enabling duration of the drive enable signal, perform cyclic timing by taking the pulse period value as a timing period, and send a timing duration to the first comparing unit; and the first comparing unit is configured to acquire current level information that satisfies a preset duty ratio according to the preset duty ratio, the pulse period value, and the timing duration, and send a drive signal of a high level or a low level to a servo motor according to the current level information.

Optionally, the pulse period providing unit includes: a latch, a latch triggering unit and a period control unit;

the period control unit is connected to the latch, and is configured to receive a pulse period update signal, and send a pulse period value of a next pulse period to the latch in response to the pulse period update signal;

the latch triggering unit is connected to the motion controller and the latch, and is configured to receive a signal indicating end of a current pulse period, or receive a latch signal from the motion controller, and send a latch control signal to the latch at the beginning of each pulse period in response to the signal indicating the end of the current pulse period or the latch signal;

the latch is configured to receive the pulse period value from the period control unit in response to the latch control signal, and send the pulse period value received from the period control unit to the timer and the first comparing unit; and the motion controller is further configured to send the latch signal to the latch triggering unit when a first pulse period starts.

Optionally, the drive signal in each pulse period is a first level signal and a second level signal in sequence;

the servo motor drive circuit further includes: a first detecting unit; and the first detecting unit is connected to the latch triggering unit and the first comparing unit, and is configured to send the signal indicating the end of the current pulse period to the latch triggering unit when a change from the second level signal to the first level signal is detected in the drive signal.

Optionally, the servo motor drive circuit further includes: a second comparing unit; and the second comparing unit is connected to the latch triggering unit and the timer, and is configured to acquire the timing duration from the timer, and send the signal indicating the end of the current pulse period to the latch triggering unit when the timing duration is equal to the pulse period value.

Optionally, the drive signal in each pulse period includes a first level signal and a second level signal in sequence;

the servo motor drive circuit further includes: a second detecting unit; and the second detecting unit is connected to the period control unit and the first comparing unit, and is configured to send the pulse period update signal to the period control unit when a change from the first level signal to the second level signal is detected in the drive signal.

Optionally, the servo motor drive circuit further includes: a third comparing unit; and the third comparing unit is connected to the period control unit and the timer, and is configured to acquire the timing duration from the timer, and send the pulse period update signal to the period control unit when the timing duration is equal to a preset timing threshold, where the preset timing threshold is greater than 0 and less than the pulse period value.

Optionally, the drive signal in each pulse period includes a pulse valid level signal and a pulse invalid level signal in sequence; and the first comparing unit is configured to: determine a pulse valid duration according to a preset duty ratio and the pulse period value, where the pulse valid duration is a product of the preset duty ratio and the pulse period value; send the pulse valid level signal to the servo motor when the timing duration is less than or equal to the pulse valid duration; and send the pulse invalid level signal to the servo motor when the timing duration is greater than the pulse valid duration.

Optionally, the drive signal in each pulse period includes a pulse invalid level signal and a pulse valid level signal in sequence; and the first comparing unit is configured to: determine a pulse invalid duration according to a preset duty ratio and the pulse period value, where the pulse invalid duration is a product of the pulse period value and a difference between 1 and the preset duty ratio; send the pulse invalid level signal to the servo motor when the timing duration is less than the pulse invalid duration, and send the pulse valid level signal to the servo motor when the timing duration is greater than or equal to the pulse invalid duration.

Optionally, the drive signal in each pulse period includes a pulse invalid level signal, a pulse valid level signal, and a pulse invalid level signal in sequence; and the first comparing unit is configured to: determine a lower limit moment of a pulse valid duration and an upper limit moment of the pulse valid duration according to a preset duty ratio and the pulse period value, where the lower limit moment of the pulse valid duration is ½ of a product of the pulse period value and a difference between 1 and the preset duty ratio, and the upper limit moment of the pulse valid duration is ½ of a product of the pulse period value and a sum of 1 and the preset duty ratio; send the pulse invalid level signal to the servo motor when the timing duration is less than the lower limit moment of the pulse valid duration; send the pulse valid level signal to the servo motor when the timing duration is less than or equal to the upper limit moment of the pulse valid duration and greater than or equal to the lower limit moment of the pulse valid duration; and send the pulse invalid level signal to the servo motor when the timing duration is greater than the upper limit moment of the pulse valid duration.

Optionally, the motion controller is further connected to the period control unit, and is configured to send an acceleration enable signal or a deceleration enable signal to the period control unit; and the period control unit is further configured to: in response to the acceleration enable signal, send the pulse period value to the latch according to a periodic sequence corresponding to a preset acceleration curve, and feed back a completion state signal of the preset acceleration curve to the motion controller; or, in response to the deceleration enable signal, send the pulse period value to the latch according to a periodic sequence corresponding to a preset deceleration curve, and feed back a completion state signal of the preset deceleration curve to the motion controller.

Optionally, the motion controller is further configured to send a motion direction signal to the servo motor.

Optionally, the motion controller is further configured to: perform initialization on the period control unit before sending the acceleration enable signal or the deceleration enable signal to the period control unit; send the latch signal to the latch triggering unit after the initialization is completed and before the acceleration enable signal or the deceleration enable signal is sent to the period control unit; and send the drive enable signal to the timer after sending the latch signal to enable the timer to count.

Optionally, the latch triggering unit includes an OR operation circuit.

According to a second aspect of the embodiments of the present application, a 3D printing apparatus is provided, which includes: the servo motor drive circuit according to the first aspect and various possible designs of the first aspect of the present application.

In the servo motor drive circuit and the 3D printing apparatus provided in the present application, the servo motor drive circuit includes: a motion controller, a timer, a first comparing unit and a pulse period providing unit. The motion controller is connected to the timer, and is configured to send a drive enable signal to the timer; the pulse period providing unit is connected to the timer and the first comparing unit, and is configured to send a pulse period value to the timer and the first comparing unit at the beginning of each pulse period; the timer is connected to the first comparing unit, and is configured to perform initialization in response to the received pulse period value in an enabling duration of the drive enable signal, perform cyclic timing by taking the pulse period value as a timing period, and send a timing duration to the first comparing unit; and the first comparing unit is configured to acquire current level information that satisfies a preset duty ratio according to the preset duty ratio, the pulse period value, and the timing duration, and send a drive signal of a high level or a low level to a servo motor according to the current level information. Thus, autonomous changing of frequency of the output drive signal and precise control of the duty ratio of the drive signal in each pulse period are realized, operational continuity and stability of the servo motor in an acceleration or deceleration phase are improved, intervention of software interruption is also reduced, and stability of an overall system is improved.

DESCRIPTION OF EMBODIMENTS

To describe the purpose, technical solutions and advantages of embodiments of the present application more clearly, the following clearly and completely describes the technical solutions in the embodiments of the present application in conjunction with accompanying drawings in the embodiments of the present application. Apparently, the described embodiments are a part of the embodiments of the present application, rather than all of the embodiments. Based on the embodiments of the present application, all other embodiments obtained by persons of ordinary skill in the art without creative efforts belong to the protection scope of the present application.

The terms "first", "second", "third", etc. in the description, claims and the above-mentioned drawings of the present application are used to distinguish similar objects, and need not be used to describe a particular order or sequence. It should be understood that data used in this way may be interchanged, where appropriate, such that the embodiments of the present application described herein may be implemented in an order other than those illustrated or described herein.

It should be understood that, in various embodiments of the present application, the size of a sequence number of each process does not mean an execution order, and the execution order of each process should be determined by its function and internal logic, and should not be limited to an implementation process of the embodiments of the present application.

It should be understood that in the present application, "including", "having" and any variation thereof, are intended to cover non-exclusive inclusion, e.g., a process, method, system, product or device including a series of steps or units is not necessarily limited to those steps or units set forth clearly, but may include other steps or units not set forth clearly or inherent to these processes, methods, products or devices.

It should be understood that in the present application, "a plurality of" refers to two or more. "And/or" is merely an association relationship describing associated objects, which represents that there may be three kinds of relationships, for example, A and/or B, may represent that there are three cases: A alone, A and B, and B alone. The character "I" generally indicates that the front and back associated objects are of an "or" relationship. "Including A, B and C" and "including A, B, C" refer to that three of A, B, and C are all included, "including A, B or C" refers to that one of A, B, and C is included, and "including A, B and/or C" refers to that any one or two or three of A, B, and C are included.

It should be understood that in the present application, "B corresponding to A", "B which corresponds to A", "A corresponds to B", or "B corresponds to A", represents that B is associated with A, and B can be determined according to A. Determining B according to A does not mean that B is determined only according to A, and B may also be determined according to A and/or other information. The matching between A and B is that similarity between A and B is greater than or equal to a preset threshold.

In the present application, depending on the context, the terms "if" and "in response to" may be interpreted as "in a case where", or "when", or "in response to determining", or "in response to detecting". Moreover, the term "connecting" herein includes any direct and indirect electrical connecting means, therefore, if a first element is described herein as being connected to a second element, it means that the first element can be directly electrically connected to the second element, or indirectly electrically connected to the second element by other elements or connecting means.

The technical solutions of the present application will be described in detail below with reference to specific embodiments. The following specific embodiments may be combined with each other, and the same or similar concepts or processes may not be repeated in some embodiments.

In an application scenario such as a 3D printer, a servo motor drive circuit in an embodiment of the present application sends a drive signal to a servo motor, and the servo motor operates in a specified direction and rotation speed according to a pulse of the drive signal, and drives a moving part of a carriage of the 3D printer to perform an accelerated, uniform or decelerated motion on a support platform, so as to realize 3D printing. Through the servo motor drive circuit provided by the embodiment of the present application, autonomous changing of frequency of the output drive signal can be realized, a duty ratio in a pulse period can be accurately controlled, operational continuity and stability of the servo motor during an acceleration or deceleration phase are improved, intervention of software interruption is reduced, and stability of an overall system is improved.

Figure 1:
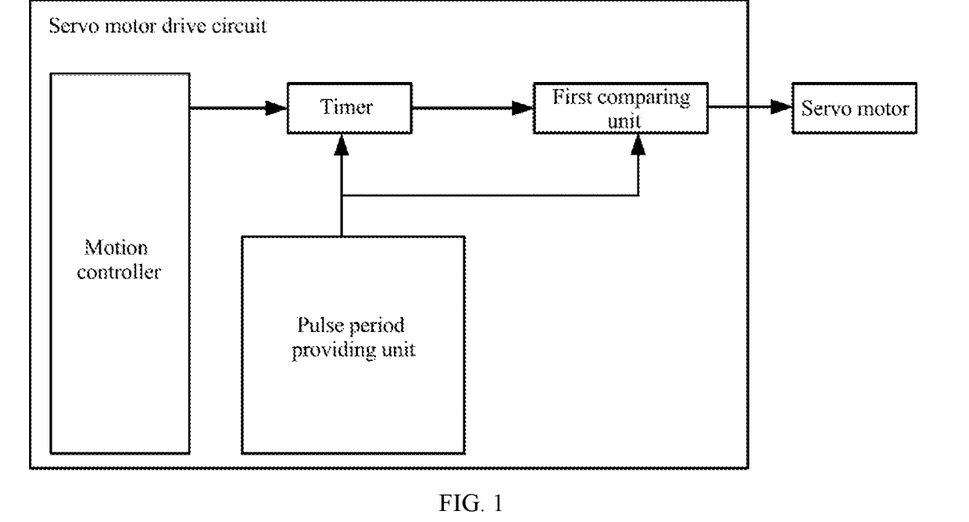
FIG. 1 is a schematic structural diagram of a servo motor drive circuit provided by an embodiment of the present application.

Referring to FIG. 1, which is a schematic structural diagram of a servo motor drive circuit provided by an embodiment of the present application, the servo motor drive circuit shown in FIG. 1 mainly includes a motion controller, a timer, a first comparing unit and a pulse period providing unit.

As shown in FIG. 1, the motion controller is connected to the timer, and is configured to send a drive enable signal to the timer. It can be understood that an output end of the drive enable signal of the motion controller is connected to an enable end of the timer, and the motion controller keeps transmitting the enable signal to the timer during a motion of the moving part or during an implementation of the 3D printing, which enables the timer to keep a power-on working state in an enabling duration of the drive enable signal.

As shown in FIG. 1, the pulse period providing unit is connected to the timer and the first comparing unit, and is configured to send a pulse period value to the timer and the first comparing unit at beginning of each pulse period. It can be understood that the pulse period providing unit stores a pulse period sequence in advance, and simultaneously sends the pulse period value of each pulse period to the timer and the first comparing unit according to the pulse period sequence. In some embodiments, the pulse period providing unit may send the pulse period value periodically, or may determine a moment to send the pulse period value according to an output signal of the timer and/or an output signal of the first comparing unit.

As shown in FIG. 1, the timer is connected to the first comparing unit, and is configured to perform initialization in response to the received pulse period value in the enabling duration of the drive enable signal, perform cyclic timing by taking the pulse period value as a timing period, and send a timing duration to the first comparing unit. It can be understood that, when receiving the pulse period value, the timer immediately performs the initialization, and initializes a current timing duration to 0 and starts counting from 0 again. Performing cyclic timing by taking the pulse period value as the timing period, can be understood as, the cyclic timing is implemented by starting counting from 0 and starting counting from 0 again after the timing duration reaches the pulse period value. For example, the pulse period value is 15, and the timer counts from 0 to 15, and then returns to 0 to count again. In a process of cyclic timing, the timer sends the timing duration to the first comparing unit in real time, for example, counting to 11, and then sending 11 to the first comparing unit and continuing to count to 12, and then sending 12 to the first comparing unit, thereby enabling the first comparing unit to obtain a current timing duration of the timer in real time.

In the embodiment shown in FIG. 1, the first comparing unit is configured to acquire current level information that satisfies a preset duty ratio according to the preset duty ratio, the pulse period value, and the timing duration, and send a drive signal of a high level or a low level to a servo motor according to the current level information. The first comparing unit may, for example, store the preset duty ratio in advance, and then perform a comparison with the timing duration according to the preset duty ratio and the pulse period value, so as to determine whether to output the high level or the low level to the servo motor, which enables the drive signal to satisfy the preset duty ratio.

In the present embodiment, the preset duty ratio is a proportion of output time of a valid level signal in one pulse period. The valid level signal may be understood as a signal component that enables the servo motor to rotate in response thereto. Outputting an output pulse corresponding to the high level is taken as an example, the duty ratio refers to a ratio of a duration of outputting the high level in a current pulse period to a current pulse period value, or a ratio of a duration occupied by a pulse in the current pulse period to the current pulse period value. For example, the drive signal may take the high level as the valid level signal, and the duty ratio is a proportion of output time of the high level in one pulse period. Or, the drive signal may take the low level as the valid level signal, and the duty ratio is a proportion of output time of the low level in one pulse period. In the present embodiment, the duty ratio is the same in each pulse period. Optionally, the preset duty ratio 1/K is not close to 0 or not close to 1, and K is a number greater than 1. For example, the preset duty ratio 1/K may be ½. Thus, the possibility that an anti-interference filter that may be introduced during signal transmission easily filters a high frequency signal as an interference wave, resulting in the servo motor being unable to be driven, is reduced.

In the embodiment shown in FIG. 1, an implementation of the first comparing unit is determined according to a form of the drive signal in a single pulse period, and the drive signal in each pulse period may have a plurality of forms. A function of the first comparing unit will be illustratively described below by taking the high level as a valid level signal in combination with three optional drive signals shown in FIG. 2 to FIG. 4.

Figure 2:
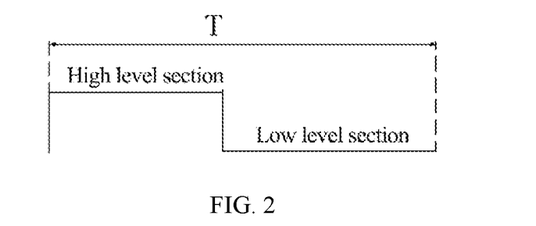
FIG. 2 is a schematic diagram of a waveform of a drive signal in a single pulse period provided by an embodiment of the present application.

In some embodiments, reference is made to FIG. 2, which is a schematic diagram of a waveform of a drive signal in a single pulse period provided by an embodiment of the present application. As shown in FIG. 2, the drive signal in each pulse period includes a pulse valid level signal and a pulse invalid level signal in sequence. That is, the high level is output first, and then the low level is output.

In the embodiment shown in FIG. 2, the first comparing unit may be configured to: determine a pulse valid duration according to a preset duty ratio and the pulse period value, where the pulse valid duration is a product of the preset duty ratio and the pulse period value; send the pulse valid level signal to a servo motor when the timing duration is less than or equal to the valid duration; and send the pulse invalid level signal to the servo motor when the timing duration is greater than the valid duration. For example, the current pulse period is T0, the high level is the valid level signal, a pulse valid duration is T0/K, a time value recorded by the timer is t0, and the first comparing unit compares t0 with T0/K: when t0≤T0/K, an output pulse corresponding to the high level is output; and when t0>T0/K, the low level is output. The first comparing unit outputs the high level or the low level in the subsequent pulse periods T1, T2, . . . , in the same manner, thereby realizing stable maintenance of the duty ratio at 1/K in each pulse period.

Figure 3:
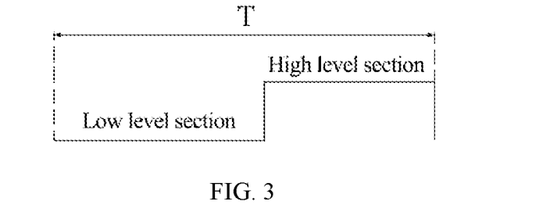
FIG. 3 is a schematic diagram of another waveform of a drive signal in a single pulse period provided by an embodiment of the present application.

In some other embodiments, reference is made to FIG. 3, which is a schematic diagram of another waveform of a drive signal in a single pulse period provided by an embodiment of the present application. As shown in FIG. 3, the drive signal in each pulse period includes a pulse invalid level signal and a pulse valid level signal in sequence. That is, the low level is output first and then the high level is output.

In the embodiment shown in FIG. 3, the first comparing unit may be configured to: determine a pulse invalid duration according to a preset duty ratio and the pulse period value, where the pulse invalid duration is a product of the pulse period value and a difference between 1 and the preset duty ratio; and send the pulse invalid level signal to a servo motor when the timing duration is less than the invalid duration, and send the pulse valid level signal to the servo motor when the timing duration is greater than or equal to the invalid duration. For example, the current pulse period is T0, the high level is the valid level signal, the invalid duration of the pulse is T0(1−1/K), a time value recorded by the timer is t0, and the first comparing unit compares t0 with T0(1−1/K): when t0<T0(1−1/K), the low level is output; and when t0≥T0(1−1/K), an output pulse corresponding to the high level is output. The first comparing unit outputs the high level or the low level in the subsequent pulse periods T1, T2, . . . , in the same manner, thereby realizing stable maintenance of the duty ratio at 1/K in each pulse period.

Figure 4:
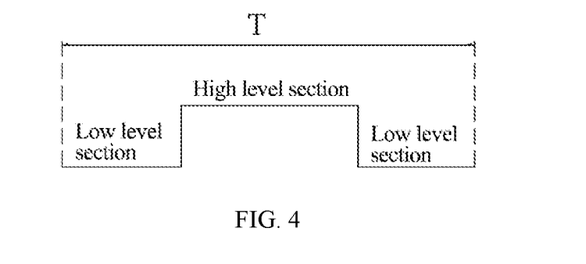
FIG. 4 is a schematic diagram of another waveform of a drive signal in a single pulse period provided by an embodiment of the present application.

In some embodiments, reference is made to FIG. 4, which is a schematic diagram of another waveform of a drive signal in a single pulse period provided by an embodiment of the present application. As shown in FIG. 4, the drive signal in each pulse period includes a pulse invalid level signal, a pulse valid level signal, and a pulse invalid level signal in sequence. That is, the low level is output first, the high level is output then, and the low level is output finally.

In the embodiment shown in FIG. 4, the first comparing unit may be configured to: determine a lower limit moment of a pulse valid duration and an upper limit moment of the pulse valid duration according to a preset duty ratio and the pulse period value, where the lower limit moment of the pulse valid duration is ½ of a product of the pulse period value and a difference between 1 and the preset duty ratio, the upper limit moment of the pulse valid duration is ½ of a product of the pulse period value and a sum of 1 and the preset duty ratio; send the pulse invalid level signal to a servo motor when the timing duration is less than the lower limit moment of the pulse valid duration; send the pulse valid level signal to the servo motor when the timing duration is less than or equal to the upper limit moment of the pulse valid duration and greater than or equal to the lower limit moment of the pulse valid duration; and send the pulse invalid level signal to the servo motor when the timing duration is greater than the upper limit moment of the pulse valid duration. For example, the current pulse period is T0, the high level is the valid level signal, the first comparing unit compares time t0 recorded by the timer with T0(K−1)/2K, and compares time t0 recorded by the timer with T0(K+1)/2K: when t0<T0(K−1)/2K, the low level is output; when T0(K−1)/2K≤t0≤T0(K+1)/2K, an output pulse corresponding to the high level is output; and when t0>T0(K+1)/2K, the low level is output. The first comparing unit outputs the high level or the low level in the subsequent pulse periods T1, T2, . . . , in the same manner, thereby realizing stable maintenance of the duty ratio at 1/K in each pulse period.

In the servo motor drive circuit provided in the present embodiment, the motion controller, the timer, the first comparing unit and the pulse period providing unit are included. The motion controller is connected to the timer, and is configured to send the drive enable signal to the timer; the pulse period providing unit is connected to the timer and the first comparing unit, and is configured to send the pulse period value to the timer and the first comparing unit at the beginning of each pulse period; the timer is connected to the first comparing unit, and is configured to perform the initialization in response to the received pulse period value in the enabling duration of the drive enable signal, perform the cyclic timing by taking the pulse period value as the timing period, and send the timing duration to the first comparing unit; and the first comparing unit is configured to acquire the current level information that satisfies the preset duty ratio according to the preset duty ratio, the pulse period value, and the timing duration, and send the drive signal of the high level or the low level to the servo motor according to the current level information. Thus, precise control of the duty ratio of the drive signal in each pulse period is realized, operational continuity and stability of the servo motor in an acceleration or deceleration phase are improved, intervention of software interruption is also reduced, and stability of an overall system is improved.

Based on the foregoing embodiments, there may be a plurality of implementations of the pulse period providing unit, and a structure of the pulse period providing unit will be illustratively described below in combination with the accompanying drawings and specific embodiments.

Figure 5:
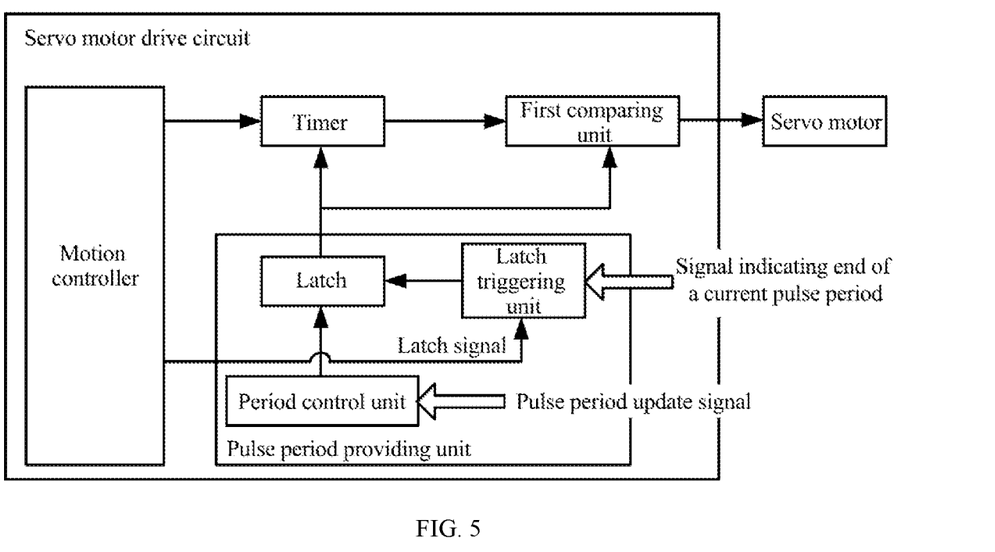
FIG. 5 is a schematic structural diagram of another servo motor drive circuit provided by an embodiment of the present application.

Referring to FIG. 5, which is a schematic structural diagram of another servo motor drive circuit provided by an embodiment of the present application, in the structure shown in FIG. 5, the pulse period providing unit may include a latch, a latch triggering unit, and a period control unit.

As shown in FIG. 5, the period control unit is connected to the latch, and is configured to receive a pulse period update signal, and send a pulse period value of a next pulse period to the latch in response to the pulse period update signal. The period control unit may be a circuit having a function of storage, and addition and subtraction logic, and when receiving the pulse period update signal, updates a current pulse period value to the pulse period value of the next pulse period by using the pulse period update signal as an enable signal, and sends the pulse period value of the next pulse period to the latch, thereby realizing updating of the pulse period value. In some embodiments, the pulse period update signal received by the period control unit may be determined according to an output signal of the timer or an output signal of the first comparing unit, and reference may be made to the following illustrated description for details.

As shown in FIG. 5, the latch triggering unit is connected to the motion controller and the latch, and is configured to receive a signal indicating end of a current pulse period, or receive a latch signal from the motion controller, and send a latch control signal to the latch at the beginning of each pulse period in response to the signal indicating the end of the current pulse period or the latch signal. The motion controller shown in FIG. 5 is further configured to send the latch signal to the latch triggering unit when a first pulse period starts.

For example, when the first pulse period starts, the motion controller sends the latch signal to the latch triggering unit, for example, a high level signal 1, and when receiving the latch signal of the high level signal 1, the latch triggering unit is enabled and sends a latch control signal to the latch. After the first pulse period, the latch triggering unit sends the latch control signal to the latch when receiving the signal indicating the end of the current pulse period. The latch signal and the signal indicating the end of the current pulse period may both be at the high level 1. After sending the latch signal, the motion controller may still be electrically connected to the latch triggering unit, but the motion controller transmits a low level 0 to the latch triggering unit, and the latch triggering unit is not enabled by the low level 0.

In some embodiments, the latch triggering unit may include or consist of an OR operation circuit. In the embodiment in which the latch triggering unit is the OR operation circuit, if any input signal of the OR operation circuit is 1, the OR operation circuit outputs a latch control signal 1 to the latch, and if all input signals of the OR operation circuit are 0, the OR operation circuit outputs a non-latch control signal 0 to the latch. In the above embodiment, the signal indicating the end of the current pulse period and the latch control signal that are input to the OR operation circuit may both be understood as 1. For example, the motion controller sends a latch signal 1 only once when the first pulse period starts, and the motion controller outputs 0 to the latch triggering unit in remaining time. It can be seen that, in the remaining time, the latch triggering unit outputs the latch control signal 1 only in response to the signal indicating the end of the current pulse period, and outputs 0 when the signal indicating the end of the current pulse period is not received.

As shown in FIG. 5, the latch is configured to receive the pulse period value from the period control unit in response to the latch control signal, and send the pulse period value received from the period control unit to the timer and the first comparing unit.

For example, when the first pulse period starts, the period control unit receives the pulse period update signal, and sends a pulse period value T0 of the first pulse period to the latch in response to the pulse period update signal, and the motion controller sends the latch signal 1 to the latch triggering unit, and sends a drive enable signal 1 to the timer. The latch triggering unit sends the latch control signal 1 to the latch in response to the latch signal. The latch receives and latches T0 sent by the period control unit in response to the latch control signal 1, and sends T0 to the timer and the first comparing unit. The timer performs the initialization when T0 is received and cyclically counts with the T0 as a period, and sends the timing duration to the first comparing unit at the same time. The first comparing unit determines whether to output the high level or the low level to the servo motor according to the input T0, the timing duration and the preset duty ratio. Before T0 arrives, the latch keeps latching T0, but does not send a new pulse period value to the timer and the first comparing unit until the current pulse period ends, and the latch triggering unit receives the signal indicating the end of the current pulse period. The latch triggering unit sends the latch control signal 1 to the latch in response to a signal 1 that the current pulse period ends. When receiving the latch control signal 1, the latch receives and latches T1 sent by the period control unit, sends T1 to the timer and the first comparing unit, to start cyclic timing and outputting of the drive signal, of a new pulse period. The period control unit may generate and send T1 to the latch before T0 arrives.

In the present embodiment, through the above-mentioned latch, the latch triggering unit and the period control unit, automatic and accurate control of the pulse period of the drive signal is realized, the intervention of the motion controller is reduced, and stability of the duty ratio of the drive signal is further improved.

In the above embodiments, the signal indicating the end of the current pulse period and the pulse period update signal may be obtained according to an output of the timer and/or the first comparing unit. Hereinafter, the structure of acquiring the signal indicating the end of the current pulse period and the structure of acquiring the pulse period update signal will be illustratively described in combination with the accompanying drawings and specific embodiments, but the present application is not limited thereto.

Figure 6:
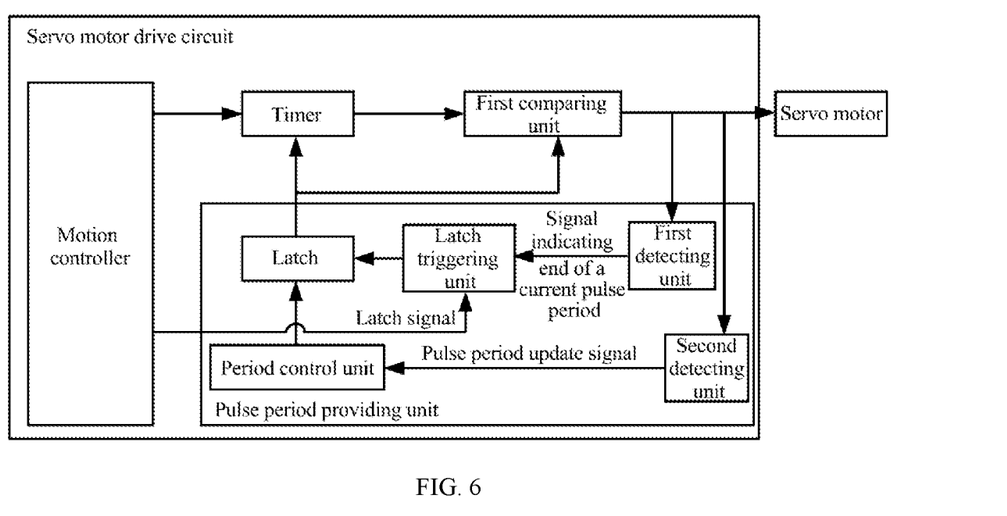
FIG. 6 is a schematic structural diagram of still another servo motor drive circuit provided by an embodiment of the present application.

Referring to FIG. 6, which is a schematic structural diagram of still another servo motor drive circuit provided by an embodiment of the present application, in the embodiment of the servo motor drive circuit shown in FIG. 6, the signal indicating the end of the current pulse period may be acquired by a first detecting unit. The drive signal in each pulse period is a first level signal and a second level signal in sequence.

The servo motor drive circuit further includes: a first detecting unit. The first detecting unit is connected to the latch triggering unit and the first comparing unit, and is configured to send the signal indicating the end of the current pulse period to the latch triggering unit when a change from the second level signal to the first level signal is detected in the drive signal.

Figure 7:
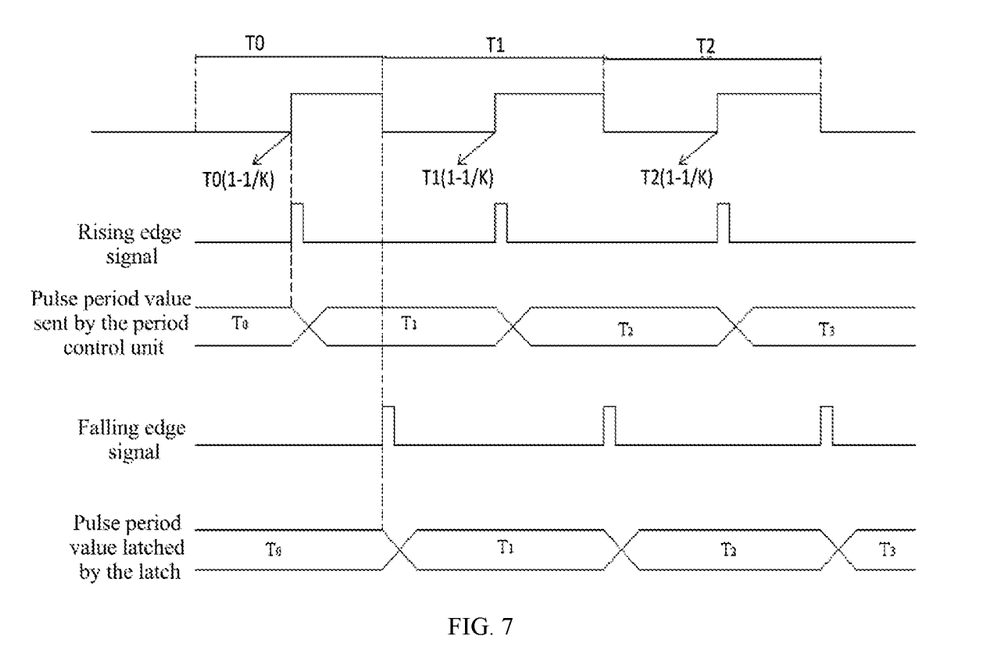
FIG. 7 is a schematic diagram of control logic provided by an embodiment of the present application.

In some embodiments, referring to FIG. 7, which is a schematic diagram of control logic provided by an embodiment of the present application, as shown in FIG. 7, the first level signal is a low level signal, and the second level signal is a high level signal, and the first detecting unit may be understood as a falling edge extracting circuit. The first comparing unit outputs a low level and then outputs a high level in one pulse period, and when the first detecting unit extracts a falling edge signal of the drive signal, it is indicated that the timing of the timer reaches the pulse period value and starts to retiming from 0, and therefore the first detecting unit generates the signal indicating the end of the current pulse period, and enables the latch to send the pulse period value of the next pulse period.

Figure 8:
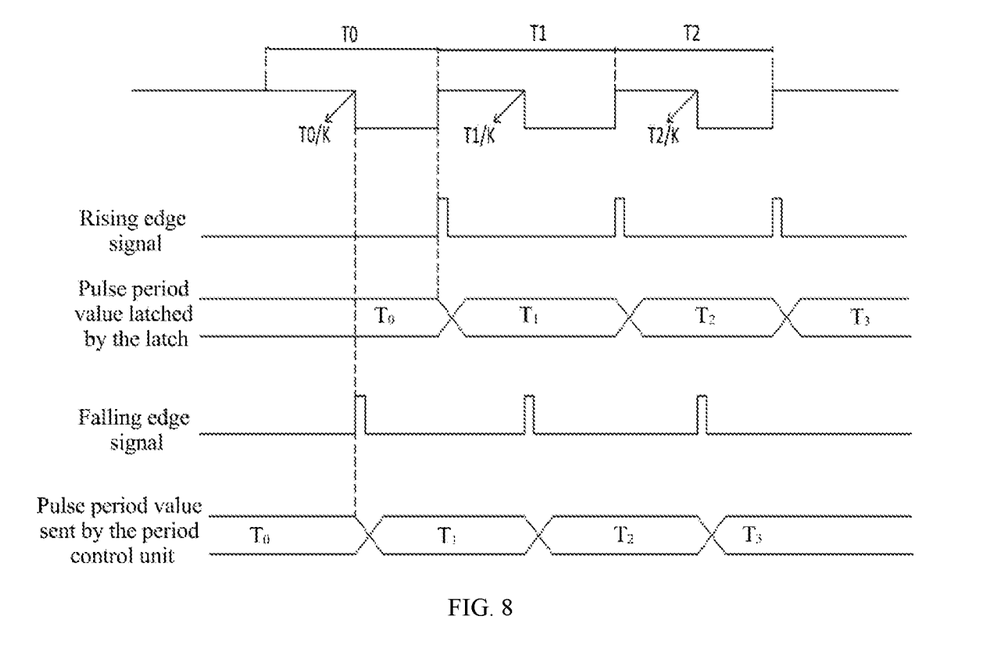
FIG. 8 is a schematic diagram of another control logic provided by an embodiment of the present application.

In some embodiments, referring to FIG. 8, which is a schematic diagram of another control logic provided by an embodiment of the present application, as shown in FIG. 8, the first level signal is a high level signal and the second level signal is a low level signal, then the first detecting unit may be understood as a rising edge extracting circuit. The first comparing unit outputs a high level and then outputs a low level in one pulse period, and when the first detecting unit extracts a rising edge signal of the drive signal, it is indicated that the timing of the timer reaches the pulse period value and starts to retiming from 0, and therefore the first detecting unit generates the signal indicating the end of the current pulse period, and enables the latch to send the pulse period value of the next pulse period.

In the present embodiment, control accuracy of the pulse period is improved through the first detecting unit.

Figure 9:
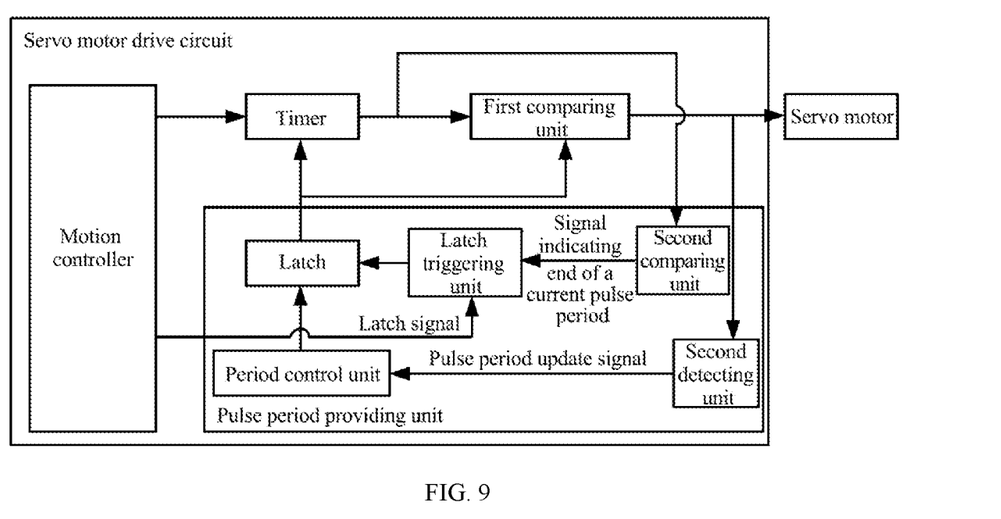
FIG. 9 is a schematic structural diagram of yet another servo motor drive circuit provided by an embodiment of the present application.

Referring to FIG. 9, which is a schematic structural diagram of yet another servo motor drive circuit provided by an embodiment of the present application, the signal indicating the end of the current pulse period in the embodiment of the servo motor drive circuit shown in FIG. 9 may be acquired by a second comparing unit. For example, the servo motor drive circuit further includes: a second comparing unit. The second comparing unit is connected to the latch triggering unit and the timer, and is configured to acquire the timing duration from the timer, and send the signal indicating the end of the current pulse period to the latch triggering unit when the timing duration is equal to the pulse period value. It can be understood that the second comparing unit compares the timing duration with the pulse period value, and when the timing duration is equal to the pulse period value, it is indicated that the current period ends, and the latch needs to provide the pulse period value of the next pulse period, then the second comparing unit sends the signal indicating the end of the current pulse period to the latch triggering unit. In the present embodiment, the control accuracy of the pulse period is improved through the second comparing unit.

With continued reference to FIG. 6 and FIG. 9, the pulse period update signal may be acquired by a second detecting unit. In the embodiments shown in FIG. 6 and FIG. 9, the drive signal in each of pulse periods may include a first level signal and a second level signal in sequence. The servo motor drive circuit can further include a second detecting unit. The second detecting unit is connected to the period control unit and the first comparing unit, and is configured to send the pulse period update signal to the period control unit when a change from the first level signal to the second level signal is detected in the drive signal.

In some embodiments, as shown in FIG. 7, the first level signal is a low level signal, and the second level signal is a high level signal, then the second detecting unit may be understood as a rising edge extracting circuit. The first comparing unit outputs a low level and then outputs a high level in one pulse period, and when the second detecting unit extracts a rising edge signal of the drive signal, it is indicated that the timer starts timing after the initialization but does not reach the pulse period value; and therefore, the second detecting unit generates the pulse period update signal, to enable the period control unit to generate and transmit the pulse period value of the next pulse period. At this time, the latch also latches the current pulse period value, and does not receive the pulse period value transmitted by the period control unit until the current pulse period ends, and through the signal indicating the end of the current pulse period output by the first detecting unit in FIG. 6 or the second comparing unit in FIG. 9, the latch immediately receives the pulse period value transmitted by the period control unit for latching and sending. It can be seen that, the pulse period value of the next pulse period can be generated in advance through the second detecting unit before the current pulse period ends, thereby improving the reliability and update speed of the pulse period value.

In some other embodiments, as shown in FIG. 8, the first level signal is a high level signal and the second level signal is a low level signal, then the second detecting unit may be understood as a falling edge extracting circuit. The first comparing unit outputs a high level and then outputs a low level in one pulse period; when the second detecting unit extracts a falling edge signal of the drive signal, it is indicated that the timer starts timing after initialization but does not reach the pulse period value; and therefore, the second detecting unit generates the pulse period update signal to enable the period control unit to generate and transmit the pulse period value of the next pulse period. At this time, the latch still latches the current pulse period value, and does not receive the pulse period value transmitted by the period control unit until the current pulse period ends, and through the signal indicating the end of the current pulse period output by the first detecting unit in FIG. 6 or the second comparing unit in FIG. 9, the latch immediately receives the pulse period value transmitted by the period control unit for latching and sending. It can be seen that, the pulse period value of the next pulse period can be generated in advance through the second detecting unit before the current pulse period ends, thereby improving the reliability and update speed of the pulse period value.

In still some other embodiments, the drive signal may include a first level signal, a second level signal and a first level signal in sequence. For example, the first comparing unit outputs a low level first and then outputs a high level and then outputs a low level in one pulse period. Compared with the foregoing embodiments, in the present embodiment, it is only possible to output the signal indicating the end of the current pulse period through the second comparing unit in FIG. 9, that is, the structure shown in FIG. 6 cannot be applied in the present embodiment. In the present embodiment, referring to FIG. 9, the second detecting unit may be construed as the above-mentioned rising edge extracting circuit or falling edge extracting circuit, so as to send the pulse period update signal to the period control unit when the rising edge or the falling edge is acquired.

In the present embodiment, through the second detecting unit, the pulse period update signal may be sent to the period control unit before the current pulse period ends, which enables the period control unit to generate the pulse period value of the next pulse period in advance, thereby improving the reliability and update speed of the pulse period value.

Figure 10:
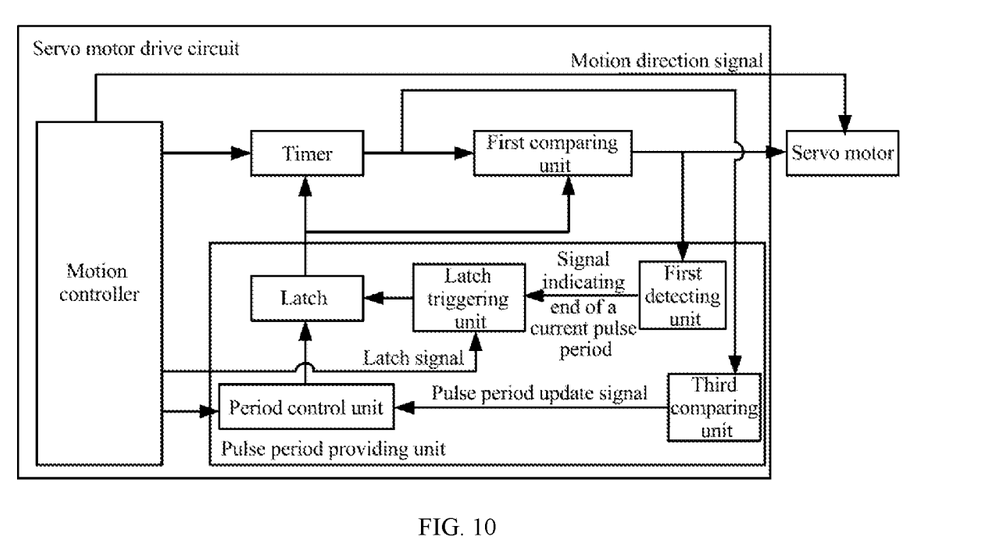
FIG. 10 is a schematic structural diagram of yet another servo motor drive circuit provided by an embodiment of the present application.
Figure 11:
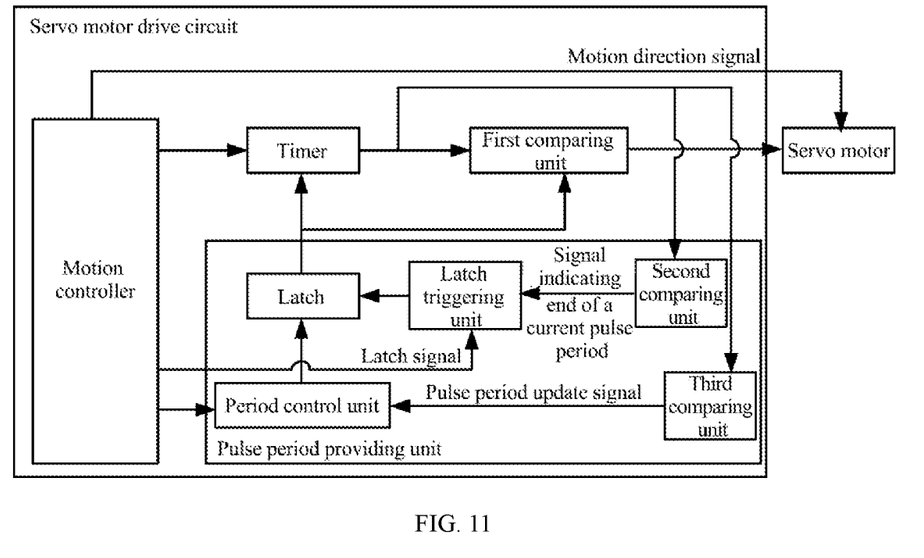
FIG. 11 is a schematic structural diagram of yet another servo motor drive circuit provided by an embodiment of the present application.

Reference is made to FIG. 10, which is a schematic structural diagram of yet another servo motor drive circuit provided by an embodiment of the present application. Reference is made to FIG. 11, which is a schematic structural diagram of yet another servo motor drive circuit provided by an embodiment of the present application. Referring to FIG. 10 and FIG. 11, the servo motor drive circuit can further include a third comparing unit. The third comparing unit is connected to the period control unit and the timer, and is configured to acquire the timing duration from the timer, and send the pulse period update signal to the period control unit when the timing duration is equal to a preset timing threshold, where the timing threshold is greater than 0 and less than the pulse period value. In the embodiment in which the pulse period update signal is sent by the third comparing unit, the signal indicating the end of the current pulse period may be sent by the first detecting unit or the second comparing unit, see FIG. 10 and FIG. 11. It can be understood that the third comparing unit compares the timing duration with the timing threshold, the timing threshold is a non-zero value smaller than the pulse period value, and when the timing duration is equal to the timing threshold, it is indicated that the current pulse period has been started, but the current pulse period has not been ended (the timing threshold is smaller than the pulse period value), and the period control unit is required to provide the pulse period value of the next pulse period. In the present embodiment, the control accuracy of the pulse period is improved through the third comparing unit.

In each of the above embodiments, the pulse period providing unit may, for example, perform automatic initialization periodically and generate the pulse period value according to pre-stored data, or may be connected to the motion controller (see FIG. 10 and FIG. 11), and perform initialization according to the control of the motion controller and generate the pulse period value. A function of initializing the pulse period providing unit is to output a first pulse period T0 to start the servo motor drive circuit in the present application.

In each of the above embodiments, the motion controller may also control the pulse period value generated by the period control unit by sending an acceleration enable signal or a deceleration enable signal to the period control unit. For example, referring to FIG. 10 and FIG. 11, the motion controller is further connected to the period control unit and is configured to send the acceleration enable signal or the deceleration enable signal to the period control unit.

In FIG. 10 and FIG. 11, the period control unit is further configured to: when the acceleration enable signal is received, send the pulse period value to the latch according to a periodic sequence corresponding to a preset acceleration curve in response to the acceleration enable signal, and feed back a completion state signal of the preset acceleration curve to the motion controller. Or, the period control unit is further configured to: when the deceleration enable signal is received, send the pulse period value to the latch according to a periodic sequence corresponding to a preset deceleration curve in response to the deceleration enable signal, and feed back a completion state signal of the preset deceleration curve to the motion controller.

With continued reference to FIG. 10 and FIG. 11, the motion controller may be further configured to: send a motion direction signal to the servo motor. The servo motor determines the direction in which it rotates according to the motion direction signal.

Based on the foregoing embodiments, the motion controller is further configured to perform initialization on the period control unit before sending the acceleration enable signal or the deceleration enable signal to the period control unit. The initialization of the period control unit may be such that the period control unit generates the first pulse period value T0 and outputs the first pulse period value, for example. After the initialization is completed and before the acceleration enable signal or the deceleration enable signal is sent to the period control unit, the motion controller may further send a latch signal to the latch triggering unit to enable the latch to receive T0 and send T0 to the timer and the first comparing unit. After sending the latch signal, the motion controller sends the drive enable signal to the timer to enable the timer to count.

On the basis of the above embodiments, an embodiment of the present application provides a 3D printing apparatus, which may include the servo motor drive circuit described in any one of the above embodiments. For example, the 3D printing apparatus includes a servo motor drive circuit that controls speed change of a servo motor in any of the above-mentioned specific embodiments and various embodiments, a servo motor, and a moving part. The first comparing unit is electrically connected to the servo motor, and the motion controller is connected to the servo motor drive circuit. The motion controller outputs a motion direction signal to the servo motor, and the first comparing unit sends a drive signal to the servo motor, to cause the servo motor to operate in a specified direction and rotation speed, and finally to drive the moving part to accelerate or decelerate.

Finally, it should be noted that each of the above embodiments is merely used for describing technical solutions of the present application, and is not limited thereto. Although the present application is described in detail with reference to the foregoing embodiments, it should be understood by those skilled in the art that the technical solutions described in the foregoing embodiments can still be modified, or equivalent replacements can be made to some or all of the technical features. These amendments or replacements do not depart from the scope of the technical solutions of the embodiments of the present application.

What is claimed is:

1. A servo motor drive circuit, comprising: a motion controller, a timer, a first comparing unit and a pulse period providing unit;
   the motion controller is connected to the timer, and is configured to send a drive enable signal to the timer;
   the pulse period providing unit is connected to the timer and the first comparing unit, and is configured to send a pulse period value to the timer and the first comparing unit at beginning of each pulse period;
   the timer is connected to the first comparing unit, and is configured to undergo initialization in response to the received pulse period value in an enabling duration of the drive enable signal, perform cyclic timing by taking the pulse period value as a timing period, and send a timing duration to the first comparing unit, wherein the cyclic timing is implemented by starting counting from 0 and starting counting from 0 again after the timing duration reaches the pulse period value; and
   the first comparing unit is configured to acquire current level information that satisfies a preset duty ratio according to the preset duty ratio, the pulse period value, and the timing duration, and send a drive signal of a high level or a low level to a servo motor according to the current level information; wherein the preset duty ratio refers to a proportion of output time of a valid level signal in one pulse period, and the current level information refers to a current level signal being either a high level signal or a low level signal.

2. The servo motor drive circuit according to claim 1, wherein the pulse period providing unit comprises: a latch, a latch triggering unit and a period control unit;
   the period control unit is connected to the latch, and is configured to receive a pulse period update signal, and send a pulse period value of a next pulse period to the latch in response to the pulse period update signal;
   the latch triggering unit is connected to the motion controller and the latch, and is configured to receive a signal indicating end of a current pulse period, or receive a latch signal from the motion controller, and send a latch control signal to the latch at the beginning of each pulse period in response to the signal indicating the end of the current pulse period or the latch signal;
   the latch is configured to receive the pulse period value from the period control unit in response to the latch control signal, and send the pulse period value received from the period control unit to the timer and the first comparing unit; and
   the motion controller is further configured to send the latch signal to the latch triggering unit when a first pulse period starts.

3. The servo motor drive circuit according to claim 2, wherein the drive signal in each pulse period is a first level signal and a second level signal in sequence;
   the servo motor drive circuit further comprises: a first detecting unit; and
   the first detecting unit is connected to the latch triggering unit and the first comparing unit, and is configured to send the signal indicating the end of the current pulse period to the latch triggering unit when a change from the second level signal to the first level signal is detected in the drive signal.

4. The servo motor drive circuit according to claim 2, further comprising: a second comparing unit; and
   the second comparing unit is connected to the latch triggering unit and the timer, and is configured to acquire the timing duration from the timer, and send the signal indicating the end of the current pulse period to the latch triggering unit when the timing duration is equal to the pulse period value.

5. The servo motor drive circuit according to claim 2, wherein the drive signal in each pulse period comprises a first level signal and a second level signal in sequence;
   the servo motor drive circuit further comprises: a second detecting unit; and
   the second detecting unit is connected to the period control unit and the first comparing unit, and is configured to send the pulse period update signal to the period control unit when a change from the first level signal to the second level signal is detected in the drive signal.

6. The servo motor drive circuit according to claim 2, further comprising: a third comparing unit; and
   the third comparing unit is connected to the period control unit and the timer, and is configured to acquire the timing duration from the timer, and send the pulse period update signal to the period control unit when the timing duration is equal to a timing threshold which is preset, wherein the timing threshold is greater than 0 and less than the pulse period value.

7. The servo motor drive circuit according to claim 1, wherein the drive signal in each pulse period comprises a pulse valid level signal and a pulse invalid level signal in sequence; and
   the first comparing unit is configured to: determine a pulse valid duration according to a preset duty ratio and the pulse period value, wherein the pulse valid duration is a product of the preset duty ratio and the pulse period value; send the pulse valid level signal to the servo motor when the timing duration is less than or equal to the pulse valid duration; and send the pulse invalid level signal to the servo motor when the timing duration is greater than the pulse valid duration.

8. The servo motor drive circuit according to claim 1, wherein the drive signal in each pulse period comprises a pulse invalid level signal and a pulse valid level signal in sequence; and
   the first comparing unit is configured to: determine a pulse invalid duration according to a preset duty ratio and the pulse period value, wherein the pulse invalid duration is a product of the pulse period value and a difference between 1 and the preset duty ratio; and send the pulse invalid level signal to the servo motor when the timing duration is less than the pulse invalid duration, and send the pulse valid level signal to the servo motor when the timing duration is greater than or equal to the pulse invalid duration.

9. The servo motor drive circuit according to claim 1, wherein the drive signal in each pulse period comprises a pulse invalid level signal, a pulse valid level signal, and a pulse invalid level signal; and the first comparing unit is configured to: determine a lower limit moment of a pulse valid duration and an upper limit moment of the pulse valid duration according to a preset duty ratio and the pulse period value, wherein the lower limit moment of the pulse valid duration is ½ of a product of the pulse period value and a difference between 1 and the preset duty ratio, and the upper limit moment of the pulse valid duration is ½ of a product of the pulse period value and a sum of 1 and the preset duty ratio; send the pulse invalid level signal to the servo motor when the timing duration is less than the lower limit moment of the pulse valid duration; send the pulse valid level signal to the servo motor when the timing duration is less than or equal to the upper limit moment of the pulse valid duration and greater than or equal to the lower limit moment of the pulse valid duration; and send the pulse invalid level signal to the servo motor when the timing duration is greater than the upper limit moment of the pulse valid duration.

10. The servo motor drive circuit according to claim 2, wherein the motion controller is further connected to the period control unit, and is configured to send an acceleration enable signal or a deceleration enable signal to the period control unit; and the period control unit is further configured to: in response to the acceleration enable signal, send the pulse period value to the latch according to a periodic sequence corresponding to a preset acceleration curve, and feed back a completion state signal of the preset acceleration curve to the motion controller; or, in response to the deceleration enable signal, send the pulse period value to the latch according to a periodic sequence corresponding to a preset deceleration curve, and feed back a completion state signal of the preset deceleration curve to the motion controller.

11. The servo motor drive circuit according to claim 10, wherein the motion controller is further configured to send a motion direction signal to the servo motor.

12. The servo motor drive circuit according to claim 10, wherein the motion controller is further configured to: perform initialization on the period control unit before sending the acceleration enable signal or the deceleration enable signal to the period control unit; send the latch signal to the latch triggering unit after the initialization is completed and before the acceleration enable signal or the deceleration enable signal is sent to the period control unit; and send the drive enable signal to the timer after sending the latch signal to enable the timer to count.

13. The servo motor drive circuit according to claim 2, wherein the latch triggering unit comprises an OR operation circuit.

14. A 3D printing apparatus, comprising the servo motor drive circuit according to claim 1.

* * * * *